(12) United States Patent
Schiemann et al.

(10) Patent No.: US 10,923,902 B2
(45) Date of Patent: Feb. 16, 2021

(54) FUSE SYSTEM FOR AT LEAST ONE LOAD OF A VEHICLE

(71) Applicant: Robert Bosch GmbH, Stuttgart (DE)

(72) Inventors: Werner Schiemann, Fellbach (DE); Thomas Lang, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 282 days.

(21) Appl. No.: 16/096,121

(22) PCT Filed: Apr. 7, 2017

(86) PCT No.: PCT/EP2017/058413
§ 371 (c)(1),
(2) Date: Oct. 24, 2018

(87) PCT Pub. No.: WO2017/186475
PCT Pub. Date: Nov. 2, 2017

(65) Prior Publication Data
US 2019/0140438 A1    May 9, 2019

(30) Foreign Application Priority Data
Apr. 26, 2016  (DE) .................. 10 2016 207 020

(51) Int. Cl.
*H02H 3/087*   (2006.01)
*H02H 3/04*    (2006.01)
(Continued)

(52) U.S. Cl.
CPC .......... *H02H 3/087* (2013.01); *H02H 1/0007* (2013.01); *H02H 3/044* (2013.01);
(Continued)

(58) Field of Classification Search
CPC ........ H02H 3/087; H02H 1/0007; H02H 3/08; H02H 3/044; H02H 3/05; B60R 16/03
See application file for complete search history.

(56) References Cited

U.S. PATENT DOCUMENTS 8,570,699 B2 * 10/2013 Shaya ................ H03K 17/0822
361/93.1
10,391,957 B2 * 8/2019 Emrani .................... H02H 3/10
(Continued)

FOREIGN PATENT DOCUMENTS

DE    102008012605    9/2009
EP    2498359         9/2012

OTHER PUBLICATIONS

International Search Report for Application No. PCT/EP2017/058413 dated Jun. 29, 2017 (English Translation, 2 pages).

*Primary Examiner* — Kyle J Moody
(74) *Attorney, Agent, or Firm* — Michael Best & Friedrich LLP

(57) ABSTRACT

The invention relates to a fuse system for at least one load of a vehicle, the fuse system having a fuse apparatus that has at least one electronic fuse for the at least one load and an evaluation and control circuit that evaluates a load current through the at least one electronic fuse and compares the load current with at least one prescribed disconnection criterion of a first parameter set, wherein the evaluation and control circuit initiates a trip process that trips the at least one electronic fuse and disconnects the load current to the corresponding load if the at least one prescribed disconnection criterion is satisfied.

10 Claims, 1 Drawing Sheet

(51) Int. Cl.
    *H02H 3/05*     (2006.01)
    *H02H 1/00*     (2006.01)
    *H02H 3/08*     (2006.01)
    *B60R 16/03*     (2006.01)

(52) U.S. Cl.
    CPC ................ *H02H 3/05* (2013.01); *H02H 3/08* (2013.01); *B60R 16/03* (2013.01)

(56) References Cited

U.S. PATENT DOCUMENTS

| | | |
|---|---|---|
| 2014/0226248 A1 | 8/2014 | Hameed et al. |
| 2019/0296541 A1* | 9/2019 | Mensch ................. H01H 9/106 |
| 2019/0312427 A1* | 10/2019 | Lang ..................... H01H 85/46 |

* cited by examiner

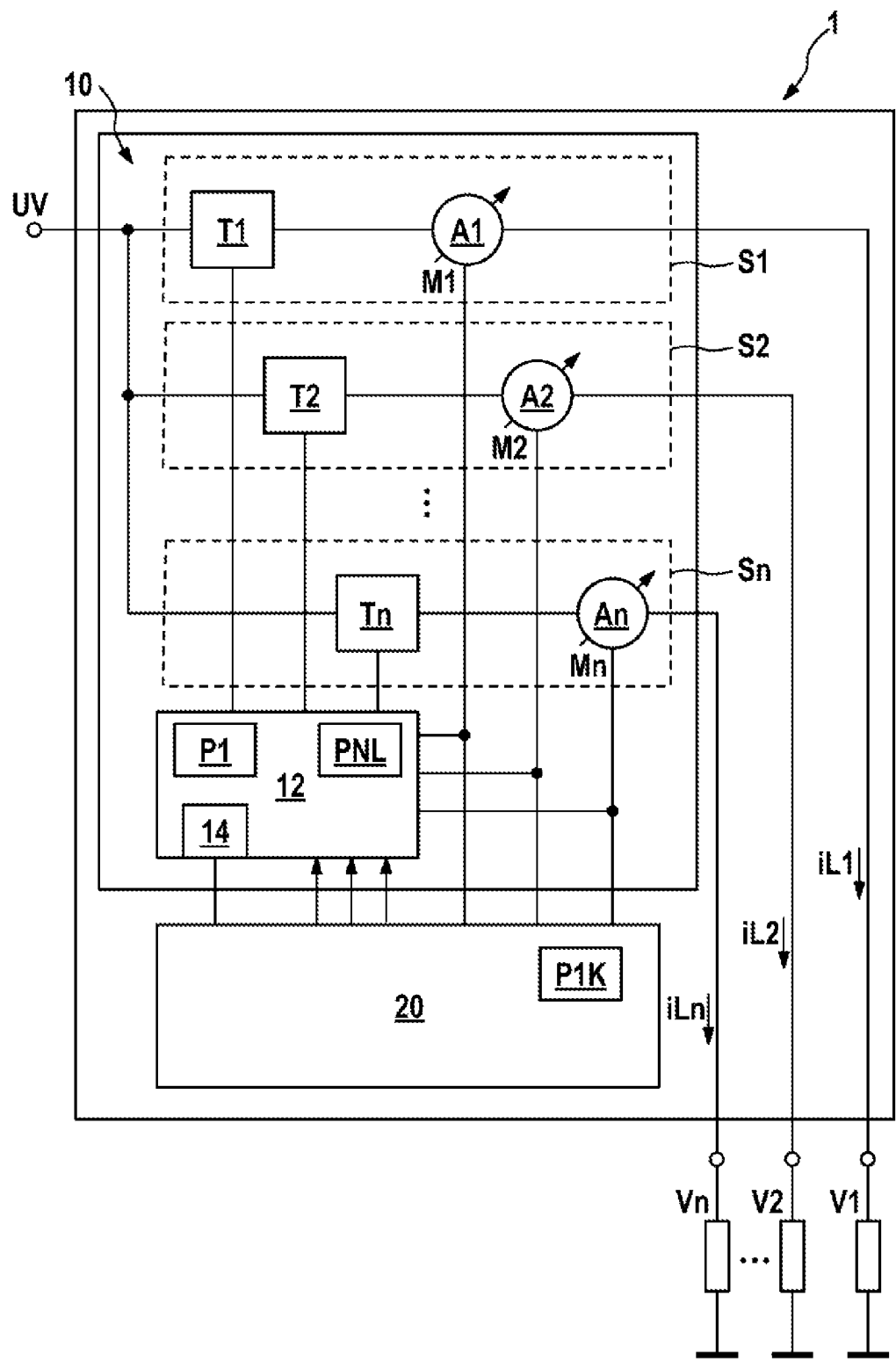

FUSE SYSTEM FOR AT LEAST ONE LOAD OF A VEHICLE

BRIEF DESCRIPTION OF THE DRAWINGS

The invention is based on a fuse system for at least one load of a vehicle.

From the prior art, instead of melting fuses and relays, integrated semiconductor components for implementing an electronic fuse protection function are known. These typically comprise an electronic power switch for connecting and disconnecting an electrical load, and elements for implementing fusing functions in the event of current overload, overheating, etc. These known electronic fuses have trip currents and trip times with fixed values. This means that the electronic fuse works at a fixed operating point and the overcurrent disconnection takes place as soon as the current passes a first lower threshold, which does not result in damage to the semiconductor switch.

In addition, in the known electronic fuses an increased inrush current, which can be caused, for example, by precharging of a capacitor of a connected electrical load impedance or by a breakaway torque of an electric motor, can lead to an overcurrent detection and a false tripping of the electronic fuse, although the current level has not yet reached a critical threshold at which damage to the semiconductor switch is likely.

In addition, such fuse systems are becoming increasingly "more intelligent", i.e. equipped with microcontrollers that can adapt to the changing boundary conditions to perform additional tasks, such as current measurement and monitoring, and/or to be able to satisfy additional physical requirements, such as arc formation in systems with a higher supply voltage of over 24V. Such a microcontroller also allows the fusing range to be kept as narrow as possible, i.e. an overcurrent event is identified and disconnected very early.

SUMMARY OF THE INVENTION

The fuse system for at least one load of a vehicle according to the invention has the advantage that an evaluation and control unit performs more complex evaluations of the detected load current, preferably using software modules or program code for the at least one load, the execution of which can be completed in the single-digit or multiple-digit microsecond range. In the event of a so-called hard (=low-impedance) short-circuit however, the evaluation and control circuit responds much faster and is even in a position to take decisions on tripping without the involvement of the evaluation and control unit. Embodiments of the fuse system according to the invention can disconnect the load current quickly in the event of a hard short-circuit and still avoid a premature or incorrect disconnection of the load current, where the load current would be switched off even though a sufficient overcurrent is not present. Since in the event of a failure of the evaluation and control unit the originally specified disconnection criteria of the first parameter set can very quickly lead to an incorrect or premature disconnection of the load current, since the evaluation and control unit can no longer take corrective action, the evaluation and control circuit monitors the function of the evaluation and control unit and in case of failure, switches into an emergency operating mode. In emergency mode, the evaluation and control circuit can maintain the function of the fuse protection system in an advantageous way by using an emergency parameter set, even in the event of a failure of the evaluation and control unit. This emergency operation differs significantly from the normal operation, in that all loads, supply lines, etc. can now no longer be optimally protected, but rather the relevant load is protected with, for example, maximum permissible disconnection thresholds. This means that in the emergency mode, embodiments of the fuse system according to the invention do not provide redundant protection functions, but provide fuse protection functions with an increased fault tolerance and a modified protection objective. This allows embodiments to provide a fault-tolerant fuse system, which comprises hardware components and software components.

Embodiments of the present invention comprise a fuse system for at least one load of a vehicle, which comprises a fuse device with at least one electronic fuse for the at least one load and with an evaluation and control circuit.

The evaluation and control circuit evaluates the load current flowing through the at least one electronic fuse and compares the load current with at least one specified disconnection criterion of a first parameter set. The evaluation and control circuit initiates a trip process, which trips the at least one electronic fuse and disconnects the load current to the corresponding load if the at least one specified disconnection criterion is satisfied. In this process an evaluation and control unit additionally evaluates the load current through the at least one electronic fuse and compares said load current with at least one specified complex disconnection criterion of a complex parameter set and interrupts the trip process initiated by the evaluation and control circuit by outputting at least one corresponding control signal to the evaluation and control circuit for a predetermined period of time. The evaluation and control circuit terminates the trip process if the load current does not satisfy the at least one complex disconnection criterion, or trips the at least one electronic fuse and disconnects the load current to the corresponding load when the load current satisfies the at least one complex disconnection criterion. In addition, the evaluation and control circuit monitors a functionality of the evaluation and control unit and, in the event of erroneous operation of the evaluation and control unit being identified, changes over to an emergency mode in which the evaluation and control circuit ignores control signals from the evaluation and control unit and evaluates the load current through the at least one electronic fuse and compares said load current with at least one specified disconnection criterion of an emergency parameter set. The evaluation and control circuit trips the at least one electronic fuse and disconnects the load current to the corresponding load when the at least one disconnection criterion of the emergency parameter set is satisfied.

The evaluation and control unit in the present case can be understood to mean an electrical device, such as a control unit, in particular an on-board network control unit, which processes and/or evaluates detected sensor and/or measuring signals. The evaluation and control unit can have at least one interface, which can be implemented in hardware and/or software. In the case of a hardware-based design, the interfaces can be, for example, part of a so-called system-ASIC, which includes the wide range of functions of the evaluation and control unit. It is also possible, however, that the interfaces are dedicated integrated circuits, or at least in part consist of discrete components. In the case of a software-based design, the interfaces can be software modules which exist, for example, on a micro-controller in addition to other software modules. Also advantageous is a computer program product with program code, which is stored on a machine-readable medium such as a semiconductor memory, a hard drive or an optical memory, and is used to perform the evaluation when the program is executed by the evaluation and control unit.

The measures and extensions according to the invention enable advantageous improvements of the fuse system specified in the invention for at least one load of a vehicle.

One particular advantage is that the evaluation and control circuit can be implemented as an application-specific integrated circuit (ASIC) and/or as a discrete electronic circuit and the evaluation and control unit can be implemented as a microcontroller. This allows the autonomous hardware components of the fault-tolerant system to be implemented simply as an ASIC or by discrete electronic circuitry and the software component to be implemented by the microcontroller.

In advantageous design of the fuse system according to the invention the first parameter set of the evaluation and control circuit can comprise disconnection criteria, which by means of first disconnection thresholds for the load currents implement a fuse protection of the load currents of the at least one load in a time frame of less than or equal to 10 µs. The emergency parameter set of the evaluation and control circuit can also comprise disconnection criteria, which can relate to second disconnection thresholds for the load currents that can be higher than the first disconnection thresholds for at least one prioritized load, and to third disconnection thresholds for the load currents that can be lower than the first disconnection thresholds for at least one low-priority load. Thus, the second disconnection thresholds for the load currents can each correspond to a maximum permissible limit of the associated prioritized load and/or the third disconnection thresholds for the load currents can lead to the disconnection of the at least one low-priority load. In addition, the complex parameter set of the evaluation and control unit can comprise disconnection criteria, which by means of complex evaluation operations can implement a fuse protection of the load currents and/or powers and/or energies of the at least one load in a time frame of greater than 10 µs. The complex parameter set of the evaluation and control unit can safeguard profiles, for example, for the at least one load which are based on combinations of load currents and/or powers and/or energies. The evaluation and control circuit is thus responsible for the control and supply functions, as well as the provision of pre-programmed disconnection thresholds. However, an intelligent fuse system protects not only load currents, but also powers and/or energies. All of this, along with the prevention of false disconnections due to increased "inrush currents", is performed by the evaluation and control unit. The protection provided by the evaluation and control circuit in parallel with the protection provided by the evaluation and control unit is performed continuously in the background. While the evaluation and control circuit therefore safeguards up to pure current thresholds in the lower time frame of less than or equal to 10 µs, by means of complex processing operations the evaluation and control unit safeguards complex disconnection criteria, such as combinations of load currents, power values, energies or profiles based thereon. However, this is normally performed for higher time frames greater than 10 µs, preferably greater than 100 µs. In emergency operation, the protection provided by the evaluation and control unit is completely removed.

In another advantageous design of the fuse system according to the invention, the at least one electronic fuse system can work bi-directionally and protect the current path to the corresponding load in both directions of current flow.

In another advantageous design of the fuse system according to the invention, the at least one electronic fuse can comprise at least one semiconductor switch, which in the conducting state can supply the associated load with a load current and in the blocking state can disconnect the load current, and at least one ammeter, which can measure the load current through the at least one semiconductor switch and output an associated measuring signal to the evaluation and control circuit and the evaluation and control unit, which can represent the measured load current. This allows a simple cost-effective assembly of the electronic fuse with commercially available components.

In another advantageous design of the fuse system according to the invention, the at least one semiconductor switch can form a measuring shunt for the corresponding ammeter. This advantageously allows layout area and assembly space to be saved.

An exemplary embodiment of the invention is shown in the drawing and is explained in more detail in the following description. In the drawing, the same reference numbers denote the same components or elements which perform identical or similar functions.

BRIEF DESCRIPTION OF THE DRAWINGS

FIG. 1 shows a schematic block diagram of an exemplary embodiment of a fuse system according to the invention for at least one load of a vehicle.

DETAILED DESCRIPTION

As is apparent from FIG. 1, the illustrated exemplary embodiment of a fuse system 1 according to the invention for at least one load V1, V2, Vn of a vehicle comprises a fuse device 10, which comprises at least one electronic fuse S1, S2, Sn for the at least one load V1, V2, Vn and an evaluation and control circuit 12. The one evaluation and control circuit 12 evaluates the load current iL1, iL2, iLn through the at least one electronic fuse S1, S2, Sn and compares the load current iL1, iL2, iLn with at least one specified disconnection criterion of a first parameter set P1. In this case the evaluation and control circuit 12 initiates a trip process, which trips the at least one electronic fuse S1, S2, Sn and disconnects the load current iL1, iL2, iLn to the corresponding load V1, V2, Vn if the at least one specified disconnection criterion is satisfied. In addition, an evaluation and control unit 20 evaluates the load current iL1, iL2, iLn through the at least one electronic fuse S1, S2, Sn and compares the load current iL1, iL2, iLn with at least one specified complex disconnection criterion of a complex parameter set P1K and interrupts the trip process initiated by the evaluation and control circuit 12 by outputting at least one corresponding control signal to the evaluation and control circuit 12 for a predetermined period of time. The evaluation and control circuit 12 terminates the trip process if the load current iL1, iL2, iLn does not satisfy the at least one complex disconnection criterion, or trips the at least one electronic fuse S1, S2, Sn and disconnects the load current iL1, iL2, iLn to the corresponding load V1, V2, Vn when the load current iL1, iL2, iLn satisfies the at least one complex disconnection criterion. In addition, the evaluation and control circuit 12 monitors a functionality of the evaluation and control unit 20 and, in the event of erroneous operation of the evaluation and control unit being identified, changes over to an emergency mode 20 in which the evaluation and control circuit 12 ignores control signals from the evaluation and control unit 20 and evaluates the load current iL1, iL2, iLn through the at least one electronic fuse S1, S2, Sn and compares said load current with at least one specified disconnection criterion of an emergency parameter set PNL. In the emergency mode the evaluation and control circuit 12 trips the at least one electronic fuse S1, S2, Sn and disconnects the load current iL1, iL2, iLn to the corresponding load V1, V2, Vn when the at least one specified disconnection criterion of the emergency parameter set PNL is satisfied.

As can also be seen from FIG. 1, the fuse system 1 comprises n electronic fuses, of which by way of example three electronic fuses S1, S2, Sn are shown, for n loads, of which by way of example three loads V1, V2, Vn are shown. The electronic fuses S1, S2, Sn each comprise at least one semiconductor switch T1, T2, Tn, which in the conducting state supplies the associated load V1, V2, Vn with a load current iL1, iL2, iLn and in the blocking state disconnects the load current iL1, iL2, iLn, and at least one ammeter A1, A2, An, which measures the load current iL1, iL2, iLn through the at least one semiconductor switch T1, T2, Tn and outputs an associated measuring signal M1, M2, Mn to the evaluation and control circuit 12 and the evaluation and control unit 20, which represents the measured load current iL1, iL2, iLn. The electronic fuses S1, S2, Sn work bi-directionally and protect the current path to the corresponding load V1, V2, Vn in both current directions. In the case of an exemplary embodiment, which is not shown, the semiconductor switches T1, T2, Tn of the electronic fuses S1, S2, Sn can each form a measuring shunt for the corresponding ammeter A1, A2, An. A monitoring function 14, which monitors the functionality of the processing and control unit 20, can be implemented in the evaluation and control circuit 12 in the manner of, for example, a "Watchdog function" known from the prior art.

In the exemplary embodiment shown, the evaluation and control circuit 12 is designed as an application-specific integrated circuit (ASIC), which has a memory in which the first parameter set P1 and the emergency parameter set PNL are stored. Of course, the evaluation and control circuit 12 can also be designed as a discrete electronic circuit. The evaluation and control unit 20 is designed as a microcontroller, in which the complex parameter set P1K is stored. The evaluation and control unit 20 implemented as a microcontroller processes program code from software modules to perform complex analyses of the measured load currents iL1, iL2, iLn.

The first parameter set P1 of the evaluation and control circuit 12 comprises disconnection criteria, which by means of first disconnection thresholds for the load currents iL1, iL2, iLn implement a fuse protection of the load currents iL1, iL2, iLn of the at least one load V1, V2, Vn in a time frame of less than or equal to 10 µs. The emergency parameter set PNL of the evaluation and control circuit 12 comprises disconnection criteria which relate to second disconnection thresholds for the load currents iL1, iL2, iLn, which are higher than the first disconnection thresholds, for at least one prioritized load V1, V2, Vn and to third disconnection thresholds for the load currents iL1, iL2, iLn, which are lower than the first disconnection thresholds, for at least one low-priority load V1, V2, Vn. In the illustrated exemplary embodiment, the second disconnection thresholds for the load currents iL1, iL2, iLn each correspond to a maximum permissible limit of the associated prioritized load V1, V2, Vn and/or the third disconnection thresholds for the load currents iL1, iL2, iLn lead to the disconnection of the at least one low-priority load V1, V2, Vn. Under the assumption that a first load V1 and a second load are prioritized loads which are very important for the vehicle's functioning, and an n-th load Vn is a lower-priority load which is not essential for the functioning of the vehicle, in the emergency parameter set PNL higher second disconnection thresholds are stored for the load currents iL1, iL2 of the first and second load V1, V2 than the first disconnection thresholds in the first parameter set P1. For the load current iLn through the n-th load Vn, a lower third disconnection threshold is stored in the emergency parameter set PNL than the first disconnection threshold in the first parameter set P1. In the extreme case, the low third disconnection threshold leads to the direct disconnection of the n-th load Vn.

The complex parameter set P1K of the evaluation and control unit 20 comprises disconnection criteria, which by means of complex evaluation operations implement a fuse protection of the load currents iL1, iL2, iLn and/or powers and/or energies of the at least one load V1, V2, Vn in a time frame of greater than 10 µs. Thus, in the exemplary embodiment shown, the complex parameter set P1K of the evaluation and control unit 20 safeguards profiles for the at least one load V1, V2, Vn, which are based on combinations of load currents iL1, iL2, iLn and/or powers and/or energies.

In embodiments of the present invention, the hardware of the fuse system is based on the evaluation and control circuit implemented as an ASIC, a set of power electronics in the form of the semiconductor switches, and the evaluation and control unit implemented as a microcontroller. The evaluation and control circuit implemented as an ASIC has an analog measuring device that monitors specified current thresholds independently of the particular evaluation and control unit, implemented as a microcontroller. If these current thresholds are exceeded by an overcurrent, the evaluation and control circuit, implemented as an ASIC, initiates the tripping or disconnection process. The evaluation and control unit implemented as a microcontroller can prevent this disconnection process, however, by rapid intervention for a predetermined period of time. At the same time, the evaluation and control circuit implemented as an ASIC monitors the evaluation and control unit implemented as a microcontroller. To the extent that the evaluation and control unit implemented as a microcontroller continues to be active, the evaluation and control unit can prevent the disconnection. If the evaluation and control unit implemented as a microcontroller has failed however, the overcurrent would provoke the disconnection. If the evaluation and control circuit implemented as an ASIC has detected the failure of the evaluation and control unit implemented as a microcontroller, however, the evaluation and control circuit implemented as an ASIC can autonomously access a second emergency parameter, specified in advance. In contrast to the first parameter set, however, the main goal of this second emergency parameter set is not optimal protection but maximum functional reliability. This may imply that lower-priority loads are disconnected immediately, to be able to provide increased energy reserves to important loads. In the above example, for example the disconnection threshold could be raised to the maximum allowable limit to prevent disconnection by the overcurrent.

The invention claimed is:

1. A fuse system (1) for at least one load (V1, V2, Vn) of a vehicle, the fusing system comprising:
a fuse apparatus (10) that has at least one electronic fuse (S1, S2, Sn) for the at least one load (V1, V2, Vn), and
an evaluation and control circuit (12) that evaluates a load current (iL1, iL2, iLn) through the at least one electronic fuse (S1, S2, Sn) and compares said load current with at least one specified disconnection criterion of a first parameter set (P1), wherein the evaluation and control circuit (12) initiates a trip process that trips the at least one electronic fuse (S1, S2, Sn) and disconnects the load current (iL1, iL2, iLn) to a corresponding load (V1, V2, Vn) if the at least one specified disconnection criterion is satisfied, wherein an evaluation and control unit (20) additionally evaluates the load current (iL1, iL2, iLn) through the at least one electronic fuse (S1, S2, Sn) and compares said load current (iL1, iL2, iLn) with at least one specified complex disconnection criterion of a complex parameter set (P1K) and interrupts a trip process initiated by the evaluation and control circuit (12) by outputting at least one corresponding control signal to the evaluation and control circuit (12) for a predetermined period of time, wherein the evaluation and control circuit (12) terminates the trip process if the load current (iL1, iL2, iLn) does not satisfy the at least one complex disconnection criterion or trips the at least one electronic fuse (S1, S2, Sn) and disconnects the load current (iL1, iL2, iLn) to the corresponding load (V1, V2, Vn) if the load current (iL1, iL2, iLn) satisfies the at least one complex disconnection criterion, wherein the evaluation and control circuit (12) monitors a functionality of the evaluation and control unit (20) and, in the event of erroneous operation of the evaluation and control unit (20) being identified, changes over to an emergency mode in which the evaluation and control circuit (12) ignores control signals from the evaluation and control unit (20) and evaluates the load current (iL1, iL2, iLn) through the at least one electronic fuse (S1, S2, Sn) and compares said load current with at least one specified disconnection criterion of an emergency parameter set (PNL), wherein the evaluation and control circuit (12) trips the at least one electronic fuse (S1, S2, Sn) and disconnects the load current (iL1, iL2, iLn) to the corresponding load (V1, V2, Vn) if the at least one specified disconnection criterion of the emergency parameter set (PNL) is satisfied.

2. The fuse system according to claim 1,
wherein the evaluation and control circuit (12) comprises (a) an application-specific integrated circuit (ASIC), (b) a discrete electronic circuit, or both (a) and (b), and the evaluation and control unit (20) is designed as a microcontroller.

3. The fuse system according to claim 1,
wherein the first parameter set (P1) of the evaluation and control circuit (12) comprises disconnection criteria, which by means of first disconnection thresholds for the load currents (iL1, iL2, iLn) implement a fuse protection of the load currents (iL1, iL2, iLn) of the at least one load (V1, V2, Vn) in a time frame of less than or equal to 10 µs.

4. The fuse system according to claim 3,
wherein the emergency parameter set (PNL) of the evaluation and control circuit (12) comprises disconnection criteria, which relate to second disconnection thresholds for the load currents (iL1, iL2, iLn) which are higher than the first disconnection thresholds, for at least one prioritized load (V1, V2, Vn) and to third disconnection thresholds for the load currents (iL1, iL2, iLn) which are lower than the first disconnection thresholds, for at least one low-priority load (V1, V2, Vn).

5. The fuse system according to claim 4,
wherein (a) the second disconnection thresholds for the load currents (iL1, iL2, iLn) each correspond to a maximum permissible limit of an associated prioritized load (V1, V2, Vn), (b) the third disconnection thresholds for the load currents (iL1, iL2, iLn) lead to the disconnection of the at least one low-priority load (V1, V2, Vn), or both (a) and (b).

6. The fuse system according to claim 1,
wherein the complex parameter set (P1K) of the evaluation and control unit (20) comprises disconnection criteria, which by means of complex evaluation operations implement a fuse protection of the load currents (iL1, iL2, iLn), powers, or energies of the at least one load (V1, V2, Vn) in a time frame of greater than 10 µs.

7. The fuse system according to claim 6,
wherein the complex parameter set (P1K) of the evaluation and control unit (20) safeguards profiles for the at least one load (V1, V2, Vn), which are based on combinations of the load currents (iL1, iL2, iLn), powers, or energies.

8. The fuse system according to claim 1,
wherein the at least one electronic fuse (S1, S2, Sn) works bi-directionally and protects a current path to the corresponding load (V1, V2, Vn) in both current directions of flow.

9. The fuse system according to claim 1,
wherein the at least one electronic fuse (S1, S2, Sn) comprises at least one semiconductor switch (T1, T2, Tn), which in a conducting state supplies an associated load (V1, V2, Vn) with a load current (iL1, iL2, iLn) and in a blocking state disconnects the load current (iL1, iL2, iLn), and at least one ammeter (A1, A2, An), which measures the load current (iL1, iL2, iLn) through the at least one semiconductor switch (T1, T2, Tn) and outputs an associated measuring signal (M1, M2, Mn) to the evaluation and control circuit (12) and the evaluation and control unit (20), which represents a measured load current (iL1, iL2, iLn).

10. The fuse system according to claim 9,
wherein the at least one semiconductor switch (T1, T2, Tn) forms a measuring shunt for a corresponding ammeter (A1, A2, An).

* * * * *